United States Patent [19]

Nakamura et al.

[11] Patent Number: 5,413,865
[45] Date of Patent: May 9, 1995

[54] WATER-REPELLENT METAL OXIDE FILM AND METHOD OF FORMING SAME ON GLASS SUBSTRATE

[75] Inventors: Ichiro Nakamura, Yokosuka; Seiji Yamazaki, Matsusaka; Osamu Takahashi, Matsusaka; Hiroaki Arai, Matsusaka; Shigeo Hamaguchi, Matsusaka, all of Japan

[73] Assignees: Central Glass Company, Limited, Yamaguchi; Nissan Motor Co., Ltd., Yokohama, both of Japan

[21] Appl. No.: 34,760

[22] Filed: Jan. 29, 1993

[30] Foreign Application Priority Data

Jan. 31, 1992 [JP] Japan .................. 4-016688
May 25, 1992 [JP] Japan .................. 4-131270
Jun. 30, 1992 [JP] Japan .................. 4-171373

[51] Int. Cl.$^6$ .................................. C03C 17/00
[52] U.S. Cl. .................................. 428/432; 428/701; 428/702; 65/60.52; 65/60.53; 427/165; 427/266; 427/269; 427/343
[58] Field of Search .............. 428/432, 701, 702; 65/60.52, 60.53; 427/165, 266, 269, 343, 376.2, 376.3, 380, 397.7

[56] References Cited

FOREIGN PATENT DOCUMENTS

60-231442 11/1985 Japan .
1-246160 10/1989 Japan .
3-75243 3/1991 Japan .
3-247537 11/1991 Japan .
3-247538 11/1991 Japan .

Primary Examiner—Archene Turner
Attorney, Agent, or Firm—Keck, Mahin & Cate

[57] ABSTRACT

The invention relates to a multilayered metal oxide film formed on a glass substrate by the sol-gel process. The film has a first metal oxide layer formed on the glass substrate and a second metal oxide layer formed on the first layer. To make the first layer minutely rough, at least two sols are respectively prepared from at least one compound selected from the group consisting of metal alkoxides and metal acetylacetonatos, such that polymers of the sols have different average molecular weights. Then, the at least two sols are mixed with a solvent so as to prepare a first coating solution. The first coating solution is applied to the glass substrate so as to form thereon a first sol film. The thus coated glass substrate is heated so as to transform the first sol film into the first metal oxide layer. To form a water-repellent metal oxide film on the first layer, a silane compound containing a fluorocarbon group is mixed with a solvent so as to prepare a second coating solution. After that, the second coating solution is applied to the first metal oxide layer so as to form thereon a second sol film. Then, the glass substrate is heated so as to transform the second sol film into the second metal oxide layer which is water-repellent.

16 Claims, 4 Drawing Sheets

WATER-REPELLENT METAL OXIDE FILM AND METHOD OF FORMING SAME ON GLASS SUBSTRATE

BACKGROUND OF THE INVENTION

The present invention relates to a water-repellent metal oxide film, and a method of forming the film on a glass substrate. The film-forming method belongs to the sol-gel process. The water-repellent coating is suitable for application, for example, to vehicular and architectural window glasses which are to be exposed to rain water.

It is well known to coat a glass substrate surface with a hard and abrasion-resistant film of a metal oxide such as silicon oxide. The metal oxide film can be formed, for example, by the sol-gel process using a solution of an organic metal compound such as a metal alkoxide.

Hitherto, there have various proposals to form a metal oxide film on a glass substrate surface for the purpose of improving water-repellency of the glass substrate.

For example, JP A-60-231442 discloses a water-repellent film on a glass substrate. The chemical composition of the film is not the same throughout the film. In fact, the film contains a higher content of a condensation product of a first organic silicon compound on the side of the glass substrate and a higher content of a condensation product of a second organic silicon compound or a fluorine compound on the exposed side. The second organic silicon compound contains a higher content of carbon or a lower content of oxygen as compared with the first organic silicon compound. Examples of the first and second organic silicon compounds are tetramethylsilane and tetraethoxysilane, respectively. However, it is necessary to take a plasma condensation method to form the film on the glass substrate. Furthermore, the film tends to be too thick in thickness.

JP A-3-247537 discloses a method of forming water-repellent film on a glass substrate. In this method, a solution of polydialkylsiloxane in which fluorine atoms are substituted for not less than 5% of hydrogen atoms of alkyl groups is applied to the glass substrate. However, the thus formed film is insufficient in mechanical strength and abrasion resistance.

JP A-1-246160 discloses a method of forming a silicon oxide film on a glass substrate surface. A coating solution is made up of a silicon alkoxide as a main component. However, this film is not superior in water repellency.

JP A-3-75243 discloses a metal oxide film to be formed on a vehicular front windshield. The film has an amorphous oxide which has at least one of Zr, Ti, Hf, Sn, Ta and In, and at least one of B and Si. However, this film is also insufficient in water repellency.

There have been other proposals to form on a glass substrate a multilayered metal oxide film having first and second metal oxide layers. The first layer is adherent to the glass substrate, and the second layer is water-repellent. To increase adhesion between the first and second layers, there have been some conventional methods to make the first layer's surface minutely rough. One example is etching the first layer with hydrofluoric acid, fluorine nitrate or the like. However, this method has the following drawbacks.

Hydrofluoric acid and fluorine nitrate are very hazardous against human body. Therefore, these compounds must be handled very cautiously. This lowers the production efficiency. Furthermore, it is difficult to precisely control the thickness of the first layer.

Another example of the above conventional methods is making the first layer minutely rough by the thermal decomposition of an organic polymer added to a metal alkoxide solution. However, this method has the following drawback.

Micro-pits which make the first layer minutely rough tend to disappear by the densification of the base layer after baking at a temperature not lower than 400° C. This tends to make the first layer relatively flat.

SUMMARY OF THE INVENTION

It is therefore an object of the present invention to provide a multilayered metal oxide film of which first layer is minutely rough, adherent to a glass substrate and superior in abrasion resistance, and of which second layer is superior in water repellency and adhesion to the first layer.

It is another object of the present invention to provide an improved method of forming the multilayered metal oxide film on a glass substrate, which is free of the above-mentioned drawbacks.

According to a first aspect of the present invention, there is provided a method of forming on a glass substrate a multilayered metal oxide film having first and second metal oxide layers, the method comprising the steps of:
(a) preparing at least two sols respectively from at least one compound so as to disperse therein at least two polymers of said at least one compound, said at least one compound being selected from the group consisting of metal alkoxides and metal acetylacetonatos, said at least two polymers having different average molecular weights;
(b) mixing said at least two sols with a solvent so as to prepare a first coating solution;
(c) applying the first coating solution to the glass substrate so as to form thereon a first sol film;
(d) heating the glass substrate so as to transform the first sol film into a first metal oxide layer which has a minutely rough surface;
(e) mixing a silane compound containing a fluorocarbon group with a solvent so as to prepare a second coating solution;
(f) applying the second coating solution to the first metal oxide layer so as to form thereon a second sol film; and
(g) heating the glass substrate so as to transform the second sol film into a second metal oxide layer which is water-repellent.

According to a second aspect of the present invention, there is provided a multilayered metal oxide film which is prepared in accordance with the above method.

Even if a glass substrate coated with the first layer is baked at a high temperature, for example, not lower than 500° C., the surface condition which is minutely rough is stable. Therefore, adhesion of the second layer to the first layer is substantially enhanced. It should be noted that the multilayered metal oxide film is high in transparency and hardness.

It should be noted that the contact area between the first and second layers is substantially large because the first layer has a minutely rough surface. Therefore, adhesion between the first and second layers is substantially enhanced.

DESCRIPTION OF THE PREFERRED EMBODIMENTS

A metal alkoxide sol and/or a metal acetylacetonato sol is used in the present invention for preparing the first coating solution because of the following reasons.

The average molecular weight of polymer of each sol can be relatively easily controlled. Furthermore, a metal oxide film made from a metal alkoxide sol and/or a metal acetylacetonato sol is high in transparency, hardness and durability. Still furthermore, a metal alkoxide and a metal acetylacetonato are relatively cheap in price and easily available.

A metal alkoxide of the present invention may be either a simple alkoxide having no organic group other than alkoxyl group, such as a methoxide, an ethoxide, an isopropoxide or the like, or an alkyl alkoxide having at least one alkyl group besides alkoxyl group, such as a monomethylalkoxide or a monoethylalkoxide.

A metal acetylacetonato of the present invention may be either a simple acetylacetonato having no organic group other than acetylacetone group, or an acetylalkoxyacetonato such as methylalkoxyacetonato or ethylalkoxyacetonato.

It is preferable to use Si, Ti and/or Zr as a metal of the metal alkoxide or of the metal acetylacetonato. Thus, examples of the metal alkoxides and the metal acetylacetonato are tetramethoxysilane, tetraethoxysilane, methyltriethoxysilane, methyltrimethoxysilane, titanium tetraisopropoxide, titanium acetylacetonato, zirconium n-butoxide, zirconium acetylacetonato, dimethyldiethoxysilane, dimethyldimethoxysilane, titanium tetra-n-butoxide, zirconium tetraisopropoxide and zirconium tetraoctyrate.

In the present invention, at least two sols are used for the purpose of making the first layer minutely rough due to the existence of numerous micro-pits. At least two kinds of polymers which are respectively dispersed in the at least two sols have different average molecular weights.

In the present invention, at least one compound selected from the group consisting of metal alkoxides and metal acetylacetonatos is used for preparing the at least two sols.

In the present invention, it is preferable to use one sol containing the polymer having an average molecular weight ranging from about 800 to about 10,000 and more preferably from about 1,500 to about 8,000 and the other at least one sol containing the polymer having an average molecular weight ranging from about 10,000 to about 600,000 and more preferably from about 50,000 to about 500,000.

The average molecular weights of the polymers can be relatively easily controlled by adjusting hydrolysis reaction or polycondensation reaction of a metal alkoxide and/or a metal acetylacetonato. In fact, this adjustment can be conducted by selecting a suitable catalyst, for example, from hydrochloric acid, nitric acid and acetic acid, and controlling the amount of the catalyst, pH value, the reaction temperature, etc. It is preferable to use a pH value of a metal alkoxide or metal acetylacetonato sol, ranging from about 1 to about 6, more preferably from about 2 to about 4. The reaction temperature of hydrolysis and polycondensation preferably ranges from about 20° C. to about 80° C., and more preferably from 25° C. to about 70° C. It may be difficult to set fixed conditions with respect to the type of catalyst, pH value, the reaction temperature, etc. for different combinations of sols.

It is preferable to mix the above-mentioned one sol with the other at least one sol in the ratio of 1:10 to 30:1, more preferably from 1:1 to 20:1, by the number of moles of solute calculated as metal oxide basis.

According to the present invention, the outer surface of the first metal oxide layer is made minutely rough such that the outer surface is scattered with numerous micro-pits and islet-like land regions. Each islet-like region is defined between two adjacent micro-pits.

In the present invention, the average diameter of a base portion of the islet-like region is in the range from about 10 to about 100 nm.

It is preferable to adjust the relative humidity under which the first coating solution is applied to the glass substrate, in the range from 20 to 80%. When relative humidities of 20% and 80% are taken in the present invention, the average diameters of the base portion of the islet-like region become about 10 nm and about 100 nm, respectively.

It is preferable to have the first coating solution having a concentration of a metal alkoxide and/or a metal acetylacetonato in an alcohol solution in the range from 0.01 to 10 wt. %. If the concentration is less than 0.01 wt. %, it is difficult to make the first layer uniformly and minutely rough. If the concentration is higher than 10 wt. %, the solution becomes too viscous. This tends to form cracks on the surface of the first layer. As the alcohol solution, it is usual to use methyl alcohol, isopropyl alcohol or 1-butanol.

It is preferable to adjust viscosity of the first coating solution in the range from 1 to 10 cP, and more preferably from 1 to 7 cP.

As the coating method, it is usual to use dip coating, spraying, flow coating or spin coating.

It is preferable to dry the first sol film at a temperature of about 100° C. for about 30 min so as to transform the first sol film into a first gel film having a minutely rough surface.

It should be noted that the minutely rough surface condition, i.e. numerous micro-pits, will not disappear even if the first gel film is baked at a temperature not lower than 500° C.

In the present invention, as a silane compound containing a fluorocarbon group, it is usual to use $CF_3CH_2CH_2Si(OCH_3)_3$,
$CF_3(CF_2)_5CH_2CH_2Si(OCH_3)_3$,
$CF_3(CF_2)_7CH_2CH_2Si(OCH_3)_3$,
$CF_3(CF_2)_7CH_2CH_2CH_3Si(OCH_3)_2$, $CF_3(CF_2)_7CH_2CH_2SiCl_3$ or a partial hydrolysate of these compounds.

In the second coating solution, the concentration of a silane compound containing a fluorocarbon group must be at least 0.1 wt. % (reduced to oxide basis) to afford sufficient water repellency to the second layer. There is no strict upper limit to the concentration, but it is in vain to make the concentration higher than 5 wt. % because the water repellency of the second layer is no longer enhanced by so increasing the concentration. The maximum water repellency is limited to 110°–115°, as expressed as contact angle of water drop on the second layer.

It is preferable to heat the glass substrate having thereon the second sol film at a temperature from 100° to 400° C.

A glass substrate according to the present invention may be colorless or colored as long as it is transparent. The glass substrate may be flat or curved in shape, or a tempered one.

The following examples are illustrative of the present invention, but these examples are not limitative.

EXAMPLE 1

A multilayered metal oxide film consisting of first and second metal oxide layers was formed on a glass substrate in accordance with the following steps.

Figure 1:
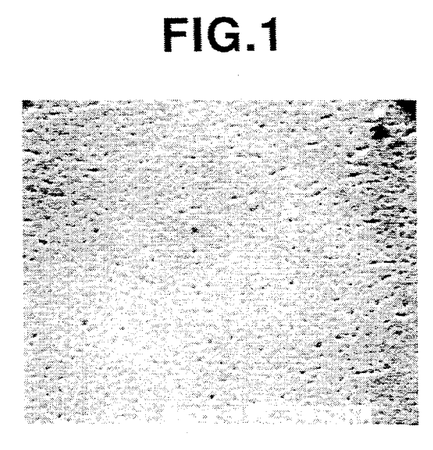
FIGS. 1 to 6 are photographs taken through a scanning electron microscope (SEM) of about 20,000 magnifications, showing surface conditions of the first layers formed on glass substrates in accordance with Examples 1 to 6 of the present invention, respectively.

Firstly, a clear float glass substrate about 100 mm square in widths and about 2 mm in thickness was washed with neutral detergent, then with water and then with an alcohol. After drying the glass substrate, it was cleaned with acetone. Separately, a first silicon ethoxide sol was prepared, such that polymer in the sol had an average molecular weight of about 3,000 and a concentration of about 30 wt. %. A second silicon ethoxide sol was prepared, such that polymer in the sol had an average molecular weight of about 100,000 and a concentration of about 6 wt. %. Then, about 20.0 g of the first sol and about 28.6 g of the second sol were mixed with about 50 g of isopropyl alcohol and about 100 g of 1-butanol in a beaker so as to make a first coating solution. The first coating solution was stirred for about 15 hr. In the first coating solution, the molar ratio of the polymer of the first sol to the polymer of the second sol was about 3.5. The first coating solution was applied to the glass substrate by dip coating in the atmosphere of a temperature of about 23° C. and a relative humidity of about 50%. Then, the thus coated glass substrate was heated at a temperature of about 270° C. for about 10 min, so as to form a first metal oxide ($SiO_2$) layer on the glass substrate. The first layer had a thickness of about 150 nm. As shown in FIG. 1, numerous micro-pits making the first layer minutely rough were observed with using SEM of about 20,000 magnifications.

Then, a second metal oxide layer was formed on the first metal oxide layer in accordance with the following steps.

1 g of heptadecatridecylfluoroalkylsilane, $CF_3(CF)_7CH_2CH_2Si(OCH_3)_3$, was mixed with 48 g of isopropyl alcohol and 1 g of 60% nitric acid so as to partially hydrolyze heptadecatridecylfluoroalkylsilane and to make a second coating solution. The second coating solution was sufficiently stirred at room temperature. The second coating solution was applied to the first layer. Then, the thus coated glass substrate was heated in an electrical furnace at a temperature of about 250° C. for about 30 min. With this, the second metal oxide layer having a thickness of about several tens nanometers was formed on the first layer.

The thus formed glass substrate having the multilayered metal oxide film thereon was subjected to the following tests.

To evaluate water repellency of the film, the contact angle of water drop on the film was measured by a contact angle meter in the atmosphere of a temperature of about 25° C.

Durability of the multilayered film was evaluated by an durability test with using a practical wiper blade for an automobile window. Under load of about 105 g, the wiper blade was kept in contact with the film on the glass substrate and moved reciprocatively until it made about 30,000 successive rubbing passes. One reciprocation was counted as one pass. Tap water was dropped to the film during this test. The degree of durability of the film was valued by the amount of a change in the contact angle of water drop from the contact angle before the endurance test. The result is shown in Table 1.

Figure 9:
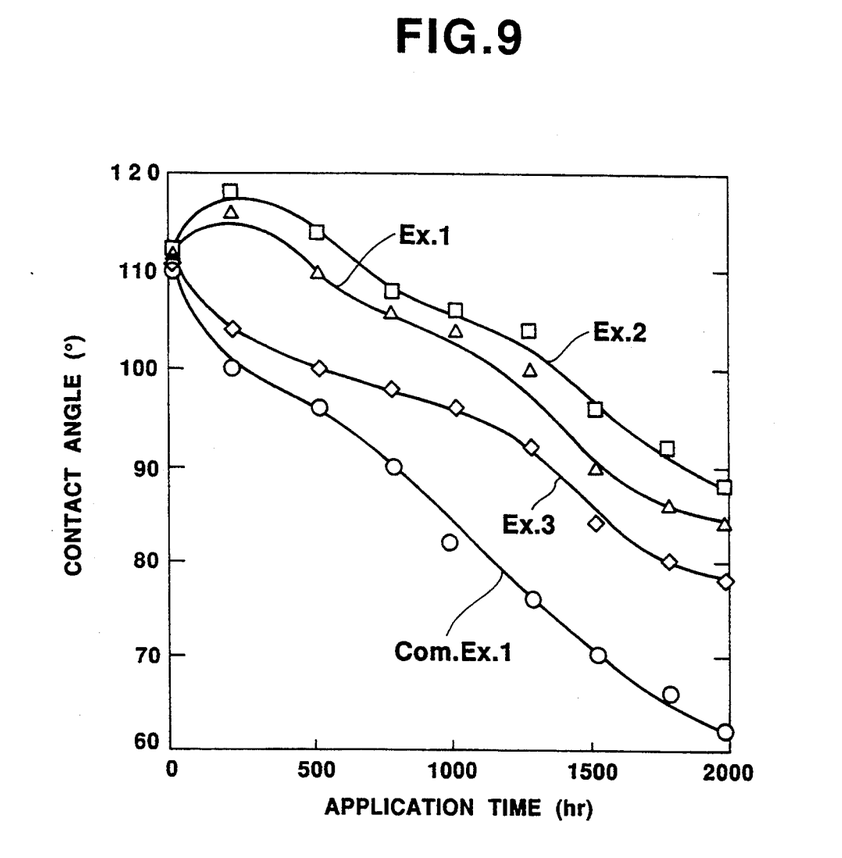
FIG. 9 is a graph showing a relationship between elapsed time in the application of light rays from a xenon lamp to a multilayered metal oxide film and the contact angle of water drop on the film with respect to Examples 1–3 according to the present invention and Comparative Example 1.

Weatherability of the multilayered film was tested by the application of light rays from a xenon lamp. In this test, the glass substrate coated with the film was alternately exposed to light rays of about 180 W/m² for about 180 hr and to tap water spray having a temperature of 20° C. for about 25 min. The surface temperature of the glass substrate was about 53° C. during the application of light rays. The degree of weatherability of the film was valued by the amount of a change in the contact angle of water drop from the contact angle before the weatherability test. The result is shown in FIG. 9.

The above-mentioned tests were also conducted on multilayered films according to Examples 2–6 and Comparative Examples 1 and 2. The results are shown in Table 1 and FIG. 9.

EXAMPLE 2

This example is a slight modification of Example 1 with respect to the amounts of the first and second sols of Example 1. In fact, about 30 g of the first sol was mixed with about 23.1 g of the second sol such that the molar ratio of the polymer of the first sol to the polymer of the second sol was about 6.5.

Figure 2:
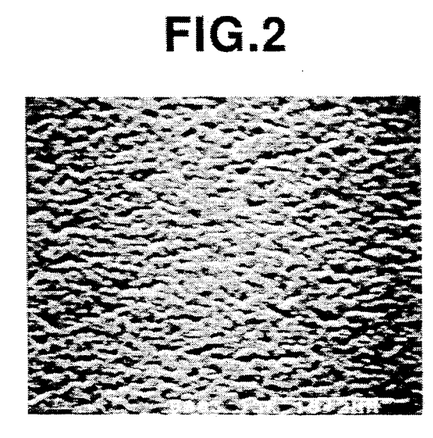

As shown in FIG. 2, numerous micro-pits making the first layer minutely rough were observed with using SEM of about 20,000 magnifications. The thickness of the second layer was several tens of nanometers.

EXAMPLE 3

This example is also a slight modification of Example 1 with respect to the amounts of the first and second sols of Example 1. In fact, about 40 g of the first sol was mixed with about 18.2 g of the second sol such that the molar ratio of the polymer of the first sol to the polymer of the second sol was about 11.

Figure 3:
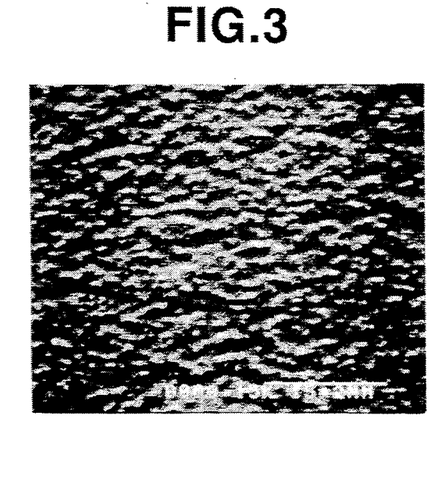

As shown in FIG. 3, numerous micro-pits making the first layer minutely rough were observed with using SEM of about 20,000 magnifications. The thickness of the second layer was several tens of nanometers.

EXAMPLE 4

This example is a slight modification of Example 1 with respect to relative humidity. In fact, the first coating solution was applied to a glass substrate in the atmosphere of a relative humidity of about 35%.

Although the results of the weatherability test with respect to the multilayered films according to Examples 4–6 are not shown in FIG. 9, they were substantially similar to that of Example 1.

Figure 4:
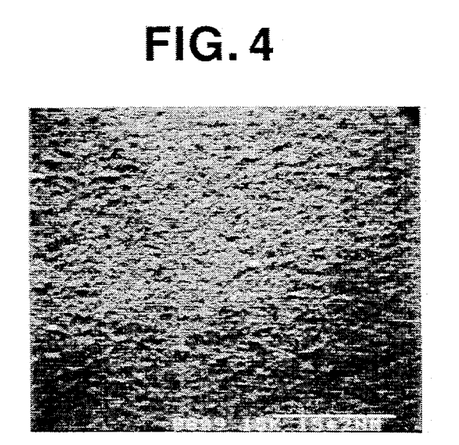

As shown in FIG. 4, numerous micro-pits making the first layer minutely rough were observed with using SEM of about 20,000 magnifications. The thickness of the second layer was several tens of nanometers.

EXAMPLE 5

This example is also a slight modification of Example 1 with respect to relative humidity. In fact, the first coating solution according to Example 1 was applied to a glass substrate in the atmosphere of a relative humidity of about 45%.

Figure 5:
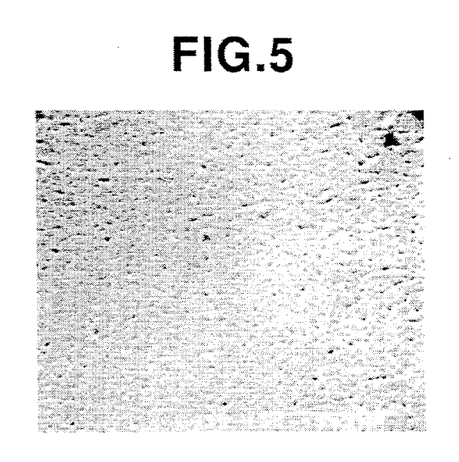

As shown in FIG. 5, numerous micro-pits making the first layer minutely rough were observed with using SEM of about 20,000 magnifications. The thickness of the second layer was several tens of nanometers.

EXAMPLE 6

This example is also a slight modification of Example 1 with respect to relative humidity. In fact, the first coating solution according to Example 1 was applied to a glass substrate in the atmosphere of a relative humidity of about 70%.

Figure 6:
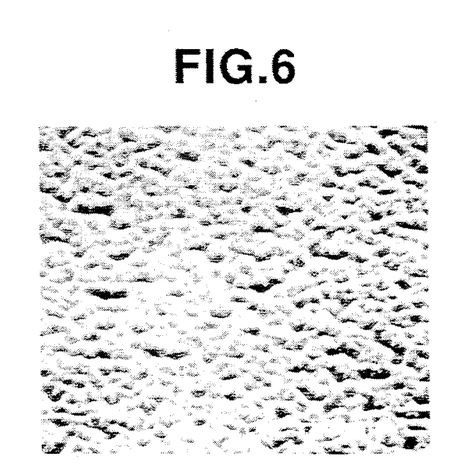

As shown in FIG. 6, numerous micro-pits making the first layer minutely rough were observed with using SEM of about 20,000 magnifications. The thickness of the second layer was several tens of nanometers.

COMPARATIVE EXAMPLE 1

Figure 7:
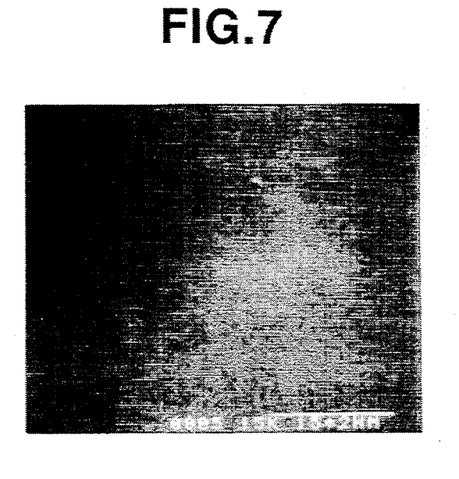
FIGS. 7 and 8 are photographs similar to FIG. 1, but showing surface conditions of the first layers in accordance with Comparative Examples 1 and 2, respectively.

The process of Example 1 was repeated except in that about 200 g of the second sol according to Example 1 was used as the first coating solution. That is, the first sol, isopropyl alcohol and 1-butanol which are used in Example 1 were omitted in preparing the first coating solution. As is shown in FIG. 7, the first layer's surface was relatively flat.

COMPARATIVE EXAMPLE 2

Figure 8:
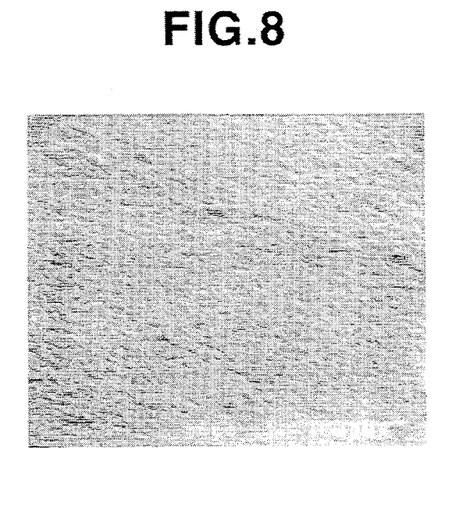

In this comparative example, a first metal oxide layer was formed on a glass substrate in accordance with Comparative Example 1. Then, the first layer was treated with about 0.2 wt. % HF solution for about 5 min. As shown in FIG. 8, the first layer which is minutely rough was observed with using SEM of about 20,000 magnifications. Then, a second metal oxide layer was formed on the first layer in accordance with Example 1.

EXAMPLE 7

A multilayered metal oxide film consisting of first and second metal oxide layers was formed on a glass substrate in accordance with the following steps.

A clear float glass substrate about 100 mm square in widths and about 2 mm in thickness was washed, as is described in Example 1. Separately, a methyltriethoxysilane sol (first sol) was prepared, such that polymer in the first sol had an average molecular weight of 5,000 (reduced to polystyrene basis). A tetraethoxysilane sol (second sol) was prepared, such that polymer in the second sol had an average molecular weight of about 350,000 (reduced to polystyrene basis). Then, predetermined amounts of the first and second sols were mixed with about 50 cc of isopropyl alcohol and 150 cc of 1-butanol in a beaker at room temperature so as to make a first coating solution. The first coating solution was prepared, such that the molar ratio of the polymer of the first sol to the polymer of the second sol was about 3.5 (reduced to oxide basis), and such that the concentration of the polymers of the first and second sols was 3.1 wt. % (reduced to oxide basis). The first coating solution was stirred for about 1 hr. The first coating solution was applied to the glass substrate by dip coating in which the glass substrate was drawn up at a constant speed of 2 mm/s. Then, the thus coated glass substrate was heated at a temperature of about 270° C. for about 5 min in an electrical furnace, and then heated at a temperature of about 620° C. for about 10 min in another electrical furnace, so as to form thereon a first layer of a $SiO_2$ film.

Then, a second metal oxide layer was formed on the first layer in accordance with the steps of Example 1.

EXAMPLE 8

In this example, Example 7 was repeated except in that the molar ratio of the polymer of the first sol to the polymer of the second sol was adjusted to about 7.8 (reduced to oxide basis), and that the concentration of the polymers of the first and second sols in the first coating solution was 4.1 wt. % (reduced to oxide basis).

EXAMPLE 9

In this example, Example 7 was repeated except in that the molar ratio of the polymer of the first sol to the polymer of the second sol was adjusted to 10 (reduced to oxide basis), and that the concentration of the polymers of the first and second sols in the first coating solution was 4.4 wt. % (reduced to oxide basis).

The thickness of the first layer according to Examples 7–9 was in the range from about 90 to about 100 nm by the measurement with a surface roughness meter.

In Examples 7–9, numerous micro-pits making the first layer minutely rough were observed on the first metal oxide layer with using a tunnel microscope and SEM.

COMPARATIVE EXAMPLE 3

A first layer of $SiO_2$ having a thickness of about 10 nm was formed on a glass substrate by vapor deposition method. Methylhydrodienepolysiloxane as a siloxane polymer was applied to the first layer by dip coating. The thus coated glass substrate was heated at a temperature of about 300° C. for about 30 min so as to form a multilayered metal oxide film.

COMPARATIVE EXAMPLE 4

A tetraethoxysilane sol (first sol) was applied to a glass substrate by dip coating. Then, the coated glass substrate was heated at a temperature of about 270° C. for about 10 min and then at a temperature of about 620° C. for about 10 min so as to form a first layer of $SiO_2$. The first layer had a thickness of about 200 nm. To afford water repellency, a second sol containing partially hydrolyzed heptadecatridecylfluoroalkylsilane was applied to the first layer. The thus coated glass substrate was heated at a temperature of about 250° C. for about 30 min, so as to form a multilayered metal oxide film.

The surface configuration of the first layers according to Comparative Examples 3 and 4 was smooth.

The thus formed glass substrates having the multilayered metal oxide films thereon, in accordance with Examples 7–9 and Comparative Examples 3 and 4, were subjected to the following tests.

To evaluate water repellency of the film, the contact angle of water drop on the film was measured in the same manner as that of Example 1.

Durability of the multilayered film was evaluated by an endurance test with using a practical wiper blade for an automobile window. Under lead of about 100 to 200 g, the wiper blade was kept in contact with the film on the glass substrate and moved reciprocatively until it made about 100,000 successive rubbing passes. One reciprocation was counted as one pass. Tap water was dropped to the film during this test. The degree of durability of the film was valued by the amount of a change in the contact angle of water drop from the contact angle before the endurance test. The results are shown in Table 2. After the test, the occurrence of scratches was checked by naked eyes. No scratches was observed on the films according to Examples 7–9 and Comparative Examples 1 and 2.

Duc Panel Weather (D.P.W.) accelerated weatherability test as a test "A" was conducted on the multilayered film. In this test, the glass substrate coated with the film was alternately exposed to a steam having a temperature of 50° C. for 4 hr, and ultraviolet rays for 8 hr at a temperature of 75° C. After the lapse of 1350 hr in this test, the contact angle of water drop was measured. The result is shown in Table 2.

Another accelerated weatherability test as a test "B" was conducted by the application of light rays from a xenon lamp to the multilayered film. After the lapse of 800 hr in this test, the contact angle of water drop was measured. The result is shown in Table 2.

The depth of micro-pits formed on the first metal oxide layer was valued by the measurement of the limit of depth at which carbon and fluorine of the second layer's material were detected in a direction perpendicular to a major surface of the multilayered film with a secondary ion mass spectrometer (SIMS). The limit of depth at which fluorine was detected in Examples 7–9 was 80 nm.

The adhesion strength test was conducted on the multilayered film by the cross-cut adhesion test according to JIS K 5400. The result showed no peeling off of the film with respect to Examples 7–9.

TABLE 1

|  | Contact Angle Before Durability Test (°) | Contact Angle After Durability Test (°) |
| --- | --- | --- |
| Ex. 1 | 113 | 87 |
| Ex. 2 | 111 | 75 |
| Ex. 3 | 112 | 77 |
| Ex. 4 | 110 | 70 |
| Ex. 5 | 114 | 75 |
| Ex. 6 | 113 | 82 |
| Com. Ex. 1 | 110 | 20 |
| Com. Ex. 2 | 113 | 35 |

TABLE 2

|  | Contact Angle Before Test (°) | Contact Angle After Durability Test (°) | Contact Angle After Weatherability Test "A" (°) | Contact Angle After Weatherability Test "B" (°) |
| --- | --- | --- | --- | --- |
| Ex. 7 | 112 | 91 | 87 | 107 |
| Ex. 8 | 112 | 96 | 83 | 109 |
| Ex. 9 | 112 | 92 | 82 | 106 |
| Com. Ex. 3 | 100 | 80 | 72 | 75 |
| Com. Ex. 4 | 110 | 50 | 40 | 65 |

What is claimed is:

1. A multilayered film formed on a glass substrate, the film having a first layer of metal oxide having numerous micro-pits and a second layer of metal oxide which is water-repellent, the film being prepared by a method comprising the steps of:
    (a) preparing at least two sols respectively from at least one compound so as to disperse therein at least two polymers of said at least one compound, said at least one compound being selected from the group consisting of metal alkoxides and metal acetylacetonatos, said at least two polymers having different average molecular weights;
    (b) mixing said at least two sols with a solvent so as to prepare a first coating solution;
    (c) applying the first coating solution to the glass substrate so as to form thereon a first sol film;
    (d) heating the glass substrate so as to transform the first sol film into a first metal oxide layer which has a minutely rough surface having numerous micro-pits thereon;
    (e) mixing a silane compound containing a fluorocarbon group with a solvent so as to prepare a second coating solution;
    (f) applying the second coating solution to the first metal oxide layer so as to form thereon a second sol film; and
    (g) heating the glass substrate so as to transform the second sol film into a second metal oxide layer which is water-repellent.

2. A metal oxide film formed on a glass substrate, the film having numerous micro-pits formed thereon, the film being prepared by a method comprising the steps of:
    (a) preparing at least two sols respectively from at least one compound so as to disperse therein at least two polymers of said at least one compound, said at least one compound being selected from the group consisting of metal alkoxides and metal acetylacetonatos said at least two polymers having different average molecular weights;
    (b) mixing said at least two sols with a solvent so as to prepare a coating solution;
    (c) applying the coating solution to the glass substrate so as to form thereon a sol film; and
    (d) heating the glass substrate so as to transform the sol film into a metal oxide film which has a minutely rough surface.

3. A multilayered film according to claim 1, wherein one polymer of said at least two polymers has an average molecular weight ranging from about 800 to about 10,000, and the other at least one polymer of said at least two polymers has an average molecular weight not lower than 10,000.

4. A multilayered film according to claim 3, wherein the other at least one polymer has an average molecular weight ranging from 10,000 to about 600,000.

5. A multilayered film according to claim 4, wherein the other at least one polymer has an average molecular weight ranging from about 50,000 to about 500,000.

6. A multilayered film according to claim 3, wherein the one polymer has an average molecular weight ranging from about 1,500 to about 8,000.

7. A multilayered film according to claim 1, wherein at step (b) said one polymer and the other at least one polymer are mixed in the ratio of 1:10 to 30:1 by the number of moles calculated as metal oxide.

8. A multilayered film according to claim 1, wherein said solvent is an alcohol solution.

9. A multilayered film according to claim 1, wherein the concentration of said silane compound in the second coating solution is not less than 0.1 wt. %.

10. A multilayered film according to claim 1, wherein the glass substrate is heated at step (d) at a temperature not lower than 100° C.

11. A multilayered film according to claim 1, wherein the glass substrate is heated at step (d) at a temperature not lower than 100° C.

12. A multilayered film according to claim 1, wherein said at least one compound is selected from the group consisting of alkoxides of Si, Ti and Zr and acetylacetonatos of Si, Ti and Zr.

13. A multilayered film according to claim 1, wherein at step (b) viscosity of the first coating solution is adjusted to 1-10 centipoises.

14. A multilayered film according to claim 1, wherein at step (b) the concentration of said at least two polymers in the first coating solution is in the range from 0.01 to 10 wt. % calculated as metal oxide.

15. A multilayered film according to claim 1, wherein at step (c) the first coating solution is applied to the glass substrate in an atmosphere having a relative humidity ranging from 20 to 80%.

16. A multilayered film according to claim 1, wherein the numerous micro-pits are stable on baking the first metal oxide layer at a temperature of at least 500° C.

* * * * *